UNITED STATES PATENT OFFICE.

ISAIAH L. ROBERTS, OF BROOKLYN, ASSIGNOR TO THE ROBERTS-BREVOORT ELECTRIC COMPANY, (LIMITED,) OF NEW YORK, N. Y.

TREATING DIAPHRAGMS AND CUPS FOR USE IN ELECTRIC BATTERIES.

SPECIFICATION forming part of Letters Patent No. 394,615, dated December 18, 1888.

Application filed October 6, 1888. Serial No. 287,424. (No specimens.)

*To all whom it may concern:*

Be it known that I, ISAIAH L. ROBERTS, of the city of Brooklyn, county of Kings, and State of New York, and a citizen of the United States, have invented a new and useful Process for Treating Separating Partitions, Diaphragms, and Cups for Use in Electric Batteries and in the Arts, of which the following is a specification.

My invention relates to a process of treating porous cups, holders, diaphragms, or separating partitions, so that the same will cease to be porous to the physical transfusion of fluids, while they will remain in such a condition that chemical energy can pass through them. In previous applications made by myself, and also in conjunction with Henry L. Brevoort, Serial Nos. 202,198, 239,679, 237,259, 280,976, 200,847, and 280,955, I have described such cups, diaphragms, or partitions. I will now describe the process which I prefer to follow in their manufacture.

I procure porous cups preferably of clay, though diaphragms, cups, or partitions of clay or other porous materials may be used. I first soak these, in the case of clay cups, for between one and two weeks in a solution of silicate of soda or potash, preferably made of a density of about 35° Baumé. After this soaking has taken place and the cup, diaphragm, or partition is thoroughly permeated and its pores are closed, I take it from the silicate bath, and I treat it in a bath of acid, preferably sulphuric acid, or the salt of a metal, preferably chloride of sodium, and if chloride of sodium is used a saturated solution is best. If sulphuric acid be used, a bath of a density of about 10° Baumé will be found satisfactory. This treatment may last from a few hours to a day.

Salts of aluminum or tin may be used instead of the silicate of soda or potash, and if such salts are used a solution is made of them in water, which solution may be nearly saturated, and after they have been absorbed in and about the pores of the holder and the same are thoroughly permeated the salts of alumina should be treated with an alkali—for example, about 10° Baumé of caustic soda—the salts of tin can be gelatinized by treatment with an acid, and the previously-described sulphuric-acid bath would be sufficient. The effect of this treatment is to gelatinize the silicate of soda or potash or other gelatinizable substances which are in or on the partition, cup, &c., and make such substances insoluble in water and some in acids. If the porous cups, diaphragms, or partitions were taken from the solution of acid or salts, the gelatinized silicate in and upon the partition, cup, &c., would dry and turn into a powder, and the cup, partition, or diaphragm would again return to the condition of a porous cup—porous to the physical transfusion of fluids—its pores not being closed. Now, to enable my cups, partitions, or diaphragms to be shipped and kept after the above treatment, I subject them immediately after their removal from the salt or the acid bath to a bath made of a saturated solution of chloride of magnesium, preferably, though other deliquescent salts can be used, such as chloride of calcium. In this bath the cup, partition, or diaphragm should be kept two or three days, and when they are removed they can be kept in the ordinary atmosphere indefinitely without the gelatinized silicate losing its valuable properties in and about the pores of the holder. In this way partitions, diaphragms, or cups can be made commercial articles, and can be manufactured, shipped, and made in large quantities and kept for use as desired.

The chloride of magnesium may be applied in various ways to the cup. For example, it may be sprinkled thereon either in the crystallized condition as a powder, or, if dissolved in water, it may be applied with a brush in successive applications; but a bath as above described is the easiest and best method to be employed.

What I claim, and desire to secure by Letters Patent, is—

1. The process of treating porous cups, diaphragms, or partitions, which consists in closing their pores with a substance which can be gelatinized, gelatinizing the substance in and on the holder, and treating the same with a deliquescent salt, substantially as described.

2. The process of treating porous cups, diaphragms, or partitions, which consists of subjecting them to a bath of silicate of soda or potash, gelatinizing the silicate of soda or potash with an acid, and preserving the gelatinized material permanently by treatment with a deliquescent salt, substantially as described.

3. The process of treating porous cups, diaphragms, or partitions, which consists in gelatinizing the material within and about the pores of the holder and treating the same with a deliquescent salt, as described.

4. The process of treating porous cups, diaphragms, or partitions, which consists in closing their pores with a substance that can be gelatinized, gelatinizing the substances in and about the pores of the holder, and treating the same with chloride of magnesium, substantially as described.

5. The process of treating porous cups, diaphragms, or partitions, which consists, first, in closing their pores with silicate of soda or potash, gelatinizing the same, and treating the cup with a solution of chloride of magnesium, substantially as described.

6. The process of treating porous cups, diaphragms, or partitions, which consists in closing the pores in the partition with silicate of soda or potash, gelatinizing the silicate of soda or potash absorbed in and about the pores of the holder by treatment with an acid, and subsequently treating the gelatinized material with chloride of magnesium, substantially as described.

7. The process of treating porous cups, diaphragms, or partitions, which consists, first, in treating them to a bath of silicate of soda or potash dissolved in water, then treating them in a bath of sulphuric acid to gelatinize the silicate, and, finally, treating the cup, diaphragm, or partition in a bath consisting of a saturated solution of chloride of magnesium, substantially as described.

ISAIAH L. ROBERTS.

Witnesses:
THOS. B. CLIFFORD,
HENRY L. BREVOORT.